US005299658A

United States Patent [19]

Cox et al.

[11] Patent Number: 5,299,658

[45] Date of Patent: Apr. 5, 1994

[54] AUTOMATIC HYDRAULIC LIFT CIRCUIT

[75] Inventors: Joseph H. Cox, Chesterfield; Richard A. Killeen, St. Charles; Brian K. Hierholzer, Hazelwood; Paul W. Roloff, St. Charles; Michael A. Olsen, Lake St. Louis, all of Mo.

[73] Assignee: Hunter Engineering Company, Bridgeton, Mo.

[21] Appl. No.: 79,130

[22] Filed: Jun. 17, 1993

[51] Int. Cl.[5] .............................................. B60S 13/00

[52] U.S. Cl. .................................. 187/8.41; 187/8.47; 254/89 H

[58] Field of Search ........................ 187/8.41, 8.47, 17, 187/29.2, 32, 34, 8.43, 9 R; 254/89R, 89 H, 45, 49

[56] References Cited

U.S. PATENT DOCUMENTS 3,279,562 10/1966 Farrell ................................ 187/8.41

4,763,761 8/1988 McKinsey et al. ................ 187/8.41

5,207,297 5/1993 Beattie et al. ...................... 187/8.41

*Primary Examiner*—D. Glenn Dayoan

*Assistant Examiner*—Kenneth Noland

*Attorney, Agent, or Firm*—Polster, Lieder, Woodruff & Lucchesi

[57] ABSTRACT

An improved hydraulic circuit for a two-post lift having a master cylinder hydraulically connected to a slave cylinder. The master cylinder and slave cylinder are sized so fluid volume displaced at the rod end of the master cylinder is equal to the volume displaced at the piston side of the slave cylinder. The hydraulic circuit employs an automatic leveling valve assembly disposed to open when the lift reaches a fully lowered position to automatically equalize the displaced fluid volume of the master and slave cylinders so as to relevel the lift each time the lift is fully lowered. A sequence valve is positioned to pre-pressurize the slave cylinder before raising to compensate for any air in the circuit and fluid compressibility. A pilot operated check valve is designed to close and stop the descent of the lift in a level position if an obstruction is encountered under a side of the lift. Velocity sensor fuses connected to cylinder ports and actuated by a drop in pressure or rapid descent of the cylinders lock the cylinders in aligned positions in the event of a hydraulic leak.

10 Claims, 2 Drawing Sheets

AUTOMATIC HYDRAULIC LIFT CIRCUIT

BACKGROUND OF THE INVENTION

This invention relates to a fluid driven, two-post lift, more specifically, to an improved hydraulic circuit for operating a fluid driven two-post lift.

Two-post lifts employing cylinders operated by hydraulic fluid under pressure are well known in the prior art. For example, U.S. Pat. No. 4,500,071 to Bagwell et al. provides a vehicle lifting apparatus employing a load bearing means operatively connected to a pair of lifting units. The lifting units employ a master cylinder and slave cylinder arranged to effect simultaneous movement of the cylinders.

U.S. Pat. No. 4,505,455 to Beatty also provides a hydraulically operated double-post lift assembly. The U.S. Pat. No. 4,892,028 to Stivers discloses a fluid operated circuit for controlling a dual-post hydraulic lift assembly.

There are at least three major problems associated with prior art two-post hydraulic lift systems. First, if there is an obstruction under one side of the lift, during downward movement of the lift the unobstructed side can continue in its downward movement causing the load bearing member to tilt to one side. This could result in a catastrophic dumping of the load.

Second, coordination of the master and slave cylinders is based on an optimum fluid displacement ratio and hydraulic pressure. Although theoretically sound, the units do not always operate in this manner. The system, due to wear, may develop fluid leaks or air may accumulate in hydraulic lines. Furthermore, wear on the cylinder may change the fluid displacement ratios between the master and slave cylinders In any event, the master and slave cylinders may not operate in a coordinated manner. The master cylinder may rise or descend more quickly than the slave cylinder causing the load bearing member to rise or descend unevenly Often, this phenomenon is more pronounced if the unit sits idle for awhile, for example, overnight. Air in the hydraulic lines, which is ordinarily dispersed as small bubbles throughout the fluid, tends to accumulate in one large bubble when the unit sets idle. Although hydraulic fluid is minimally compressible, on the order of 0.5% per 1000 psi, a large air bubble is quite compressible and can disrupt coordinated operation of the master and slave cylinders.

A third major problem associated with the prior art two-post lifts is lift failure, or rapid descent of the lift due to a drop in fluid pressure. This phenomenon is caused when, for example, the hydraulic lines spring a leak with a load in the elevated position.

There have been a number of attempts made to remedy the major problems associated with prior art two-post lifts For example, in the above mentioned U.S. Pat. No. 4,505,455 to Beatty, the inventors provided a safety latch means to lock the moveable elements in place to block accidental descent of the load bearing unit upon sudden loss of fluid from the cylinders. This safety latch feature remedies only one of the triumvirate of major problems associates with prior art lifts. Moreover, it does not solve the problem of rapid descent if the latches are disengaged and the cylinders are in some stage of downward or upward movement.

U.S. Pat. No. 4,892,028 to Stivers attempts to remedy the problems associated with both an obstruction under one side of the unit as well as the major problem associated with the lack of coordination between the cylinders. Stivers employs a system of pulleys and chains with an integrated hydraulic system. The hydraulic system employs a plurality of pilot valves designed to halt the downward movement of one side of the lift device if the other side is obstructed. This system is complex, having a plurality of parts including the chain and pulley system, as well as the associated hydraulic circuitry. Moreover, if the hydraulic circuit fails, the chains may slacken on one side or the other causing a tilting of the load bearing member and dumping of the load.

Stivers employs a means for re-leveling the lift, side-to-side, should the load bearing member become out of level due to leaking fittings or seals. Stivers employs slots at the fully lowered and fully raised positions of the master cylinder in order to allow fluid to flow around the piston to the slave cylinder to equalize hydraulic pressure and level the lift when the lift is either fully raised or lowered. This automatic leveling feature introduces an inherent out-of-level condition by allowing fluid to flow around the master cylinder piston for a short period of time as the master cylinder piston is moving past the slot location. The lower slot can, in fact, add to the out-of-level condition of the lift during raising operation.

SUMMARY OF THE INVENTION

It is, therefore, a principal object of the present invention to provide a hydraulic circuit directly connected between the master and slave cylinder that provides a coordinated movement between the master and slave cylinders during normal operation.

Another object of the present invention is to provide a hydraulic circuit for a two-post lift that incorporates an automatic leveling valve assembly which relevels the lift each time the lift is fully lowered.

It is another object of the present invention to provide a hydraulic circuit for a two post lift having a pilot operated check valve which closes to halt the descent of one side of the lift if there is an obstruction under the other side.

Yet another object of the present invention is to provide a hydraulic circuit for a two-post lift having velocity sensor elements positioned at the outlet ports of the hydraulic cylinders to sense excess velocity of fluid and to close and hydraulically lock the cylinders in a level condition in the event of a leak in the hydraulic system.

Other objects and features will be in part apparent and in part pointed out hereinafter.

Briefly stated, an improved hydraulic circuit for a hydraulic powered two-post lift of the present invention utilizes a master cylinder hydraulically connected to a slave cylinder. A hydraulic pump unit supplies pressurized fluid to the piston end of the master cylinder causing it to extend and, at the same time, fluid in the rod end of the master cylinder is forced into the piston side of the slave cylinder The cylinders are appropriately sized so that the fluid volume displaced at the rod end of the master cylinder is equal to the volume displaced at the piston end of the slave cylinder. The circuit contains an automatic leveling means to equalize fluid displacement in each cylinder to relevel the lift. An actuator on the master cylinder side of the load bearing member opens the automatic leveling means when the lift reaches the ground, thereby releveling the lift each time the lift is fully lowered. A manual leveling valve is also provided. A sequence valve is positioned in the circuit to pre-pressurize the slave cylinder before the lift begins to raise to compensate for air in the circuit and fluid compressibility. A pilot operated check valve is designed to close and stop the descent of the cylinders in aligned positions if an obstruction is encountered under one side or the other of the load bearing member. Velocity sensor fuses connected directly to the hydraulic cylinder ports close valves upon excess fluid velocity and lock the cylinders in an aligned position in the event of a hydraulic line leak.

BRIEF DESCRIPTION OF THE DRAWINGS

Similar reference characters indicate similar parts throughout the several views of the drawings.

DESCRIPTION OF THE PREFERRED EMBODIMENT

Figure 1:
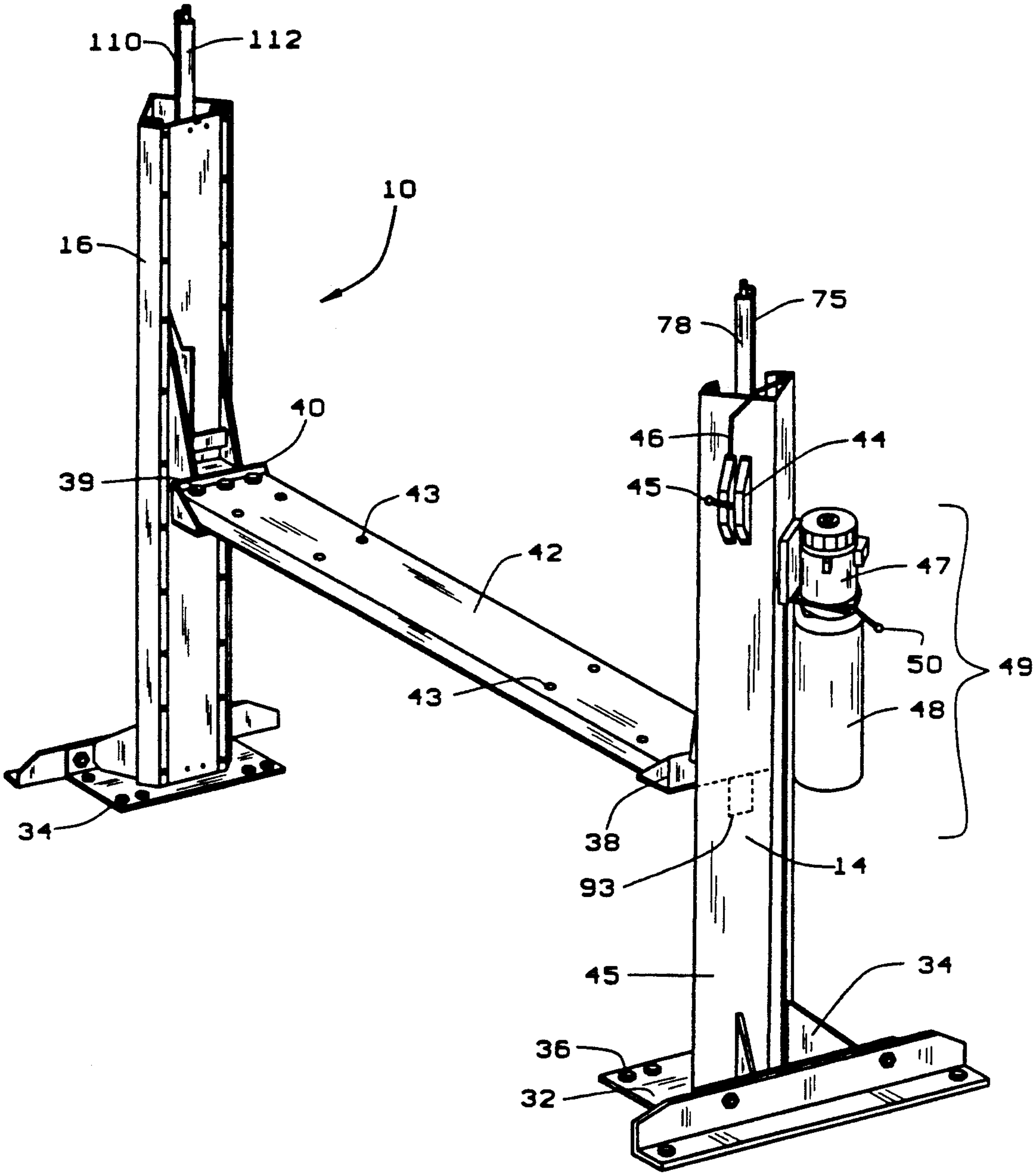
FIG. 1 is a perspective view of a two-post automatic lift employing the improved hydraulic circuit of the present invention.

Referring now to the drawings, there is shown a hydraulic fluid operated, two-post lift assembly 10. Assembly 10 includes a pair of posts 14 and 16 having hollow interiors and being open on the upper ends thereof. The posts of the present example are triangular in shape as viewed in FIG. 1 Also included are a double-acting hydraulically operated master cylinder 78 (FIG. 2) within post 14 and a single-acting slave cylinder 112 (FIG. 2) within post 16 having moveable pistons 79 and 113, respectively and two piston rods 80 and 114, respectively. The upper ends of cylinders 78 and 112 are operatively connected to hydraulic lines 75 and 110, respectively, as will be explained hereinafter.

Base supports 32, 34 are bolted or otherwise appropriately connected to the bottom ends of posts 14 and 16, respectively and are designed to bolt, as with bolts 36, or otherwise be secured to a floor to hold the lift assembly in place for use. It should be noted that bases 32 and 34 may be of any appropriate configuration and style so as to adequately support posts 14 and 16 and to be appropriately bolted or secured to a floor.

Bracket 38 is mounted to cylinder 78 and bracket 40 is mounted to cylinder 112 and movable therewith. A load bearing member 42 is attached at one end to bracket 38 with bolts (not shown) and at the other end to bracket 40 also with bolts 39. A pair of wheel support runways, not shown, can be mounted, as at holes 43, to accommodate an automobile or other vehicle. An automatic equalization valve actuator 93 extends from bottom surface of bracket 38 at the master cylinder end and is operatively connected to the improved hydraulic circuit as is further explained below.

A pair of safety latch means, as at 44, actuated by handle 45 through cable 46 are mounted at an upper end of posts 14 and 16 to mechanically secure brackets 38 and 40 when extended to secure bearing member 42 in an elevated position. A motor and pump assembly, as shown together at 49, a hydraulic reservoir 48 and a manual lowering valve 50 are mounted on post 14 and hydraulically connected to the hydraulic circuit as will now be explained in detail.

Figure 2:
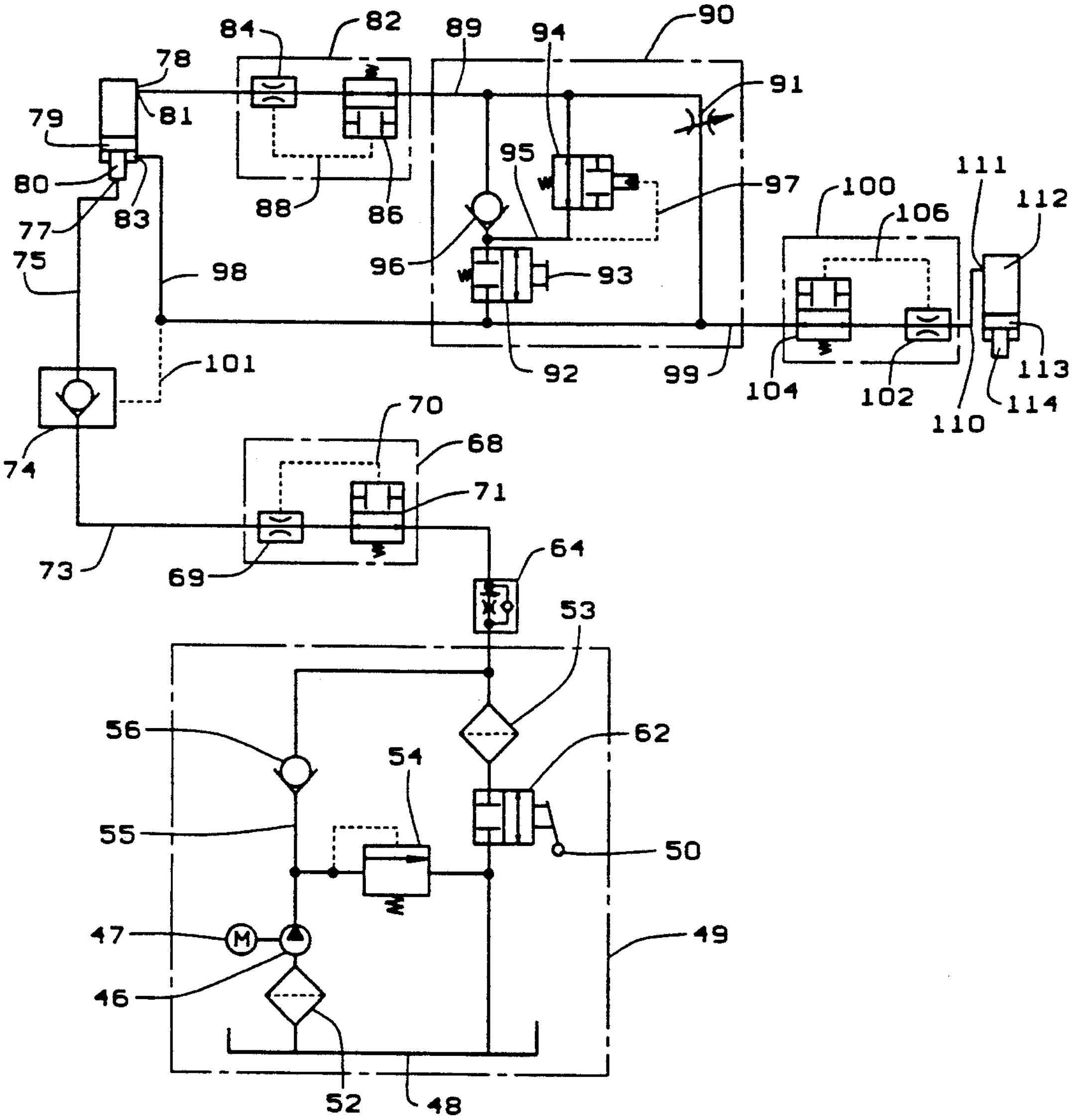
FIG. 2 is a schematic diagram of the improved fluid operated circuit used to actuate the two-post lift of FIG. 1.

The improved hydraulic circuit of the present invention is best illustrated in FIG. 2. A power unit assembly shown generally at 49 includes reservoir 48, a motor 47 and hydraulic pump 46. A filter 52 is situated between the pump and the reservoir. A pilot actuated relief valve 54 is connected in line 55 between check valve 56 and pump 46 and drains through line 58 into reservoir 48. A conventional, manually operated lowering valve 62 operated by handle 50 (FIG. 1) is connected at one end of line 58. Power unit assembly 49 is connected to one end of a pressure compensated flow control valve 64, which is connected at the opposite end to one side of a velocity fuse assembly 68. Assembly 68 has a fixed restriction element 69 connected to a normally opened two-position valve 71 by pilot line 70. The other side of velocity fuse assembly 68 is connected to a pilot operated check valve 74 by hydraulic line 73. Check valve 74 is connected to a cylinder port 77 on master cylinder 78 by flow line 75.

A piston side port 81 on master cylinder 78 is connected to velocity fuse assembly 82 comprised of a fixed resistance element 84 and a normally opened two-position valve 86. A pilot line 88 also connects fixed resistance element 84 to valve 86.

Velocity fuse 82 is connected to an automatic leveling assembly 90. Automatic leveling assembly 90 contains a normally closed automatic equalization valve 92 and a normally opened sequence valve 94 which is connected to a check valve 96 by flow line 95 as well as by pilot line 97. Automatic equalization valve 92 employs actuator 93 as previously described (see FIG. 1). A manual leveling valve 91 is also hydraulically connected within the automatic leveling assembly.

Automatic leveling assembly 90 is connected by flow line 99 to velocity fuse 100 containing a fixed resistance element 102 and a normally opened two-position valve 104 connected by pilot line 106 to element 102. Automatic leveling assembly 90 is connected through fuse 100 and by flow line 110, to port 111 on the piston side of slave cylinder 112 Flow line 110 is connected to flow line 99 which is connected to flow line 98, which in turn is directly connected to port 83 on the rod side of master cylinder 78. Line 99 is also connected to pilot operated check valve 74 through pilot line 101.

In operation, the improved hydraulic circuit works as follows:

To raise the load bearing member 42 (FIG. 1) the operator activates motor 47 which operates hydraulic pump 46 causing fluid to be pulled from reservoir 48 through filter 52 into pump 46. Fluid leaves pump 46 under pressure through check valve 56 before leaving power unit 49. Check valve 56 prevents fluid from returning to pump 46 in a reversed direction.

If fluid pressure generated by pump 46 exceeds a pre-set pressure setting, pressure relief valve 54 opens and allows fluid exiting pump 46 to flow back into reservoir 48.

Fluid exiting power unit assembly 49 flows through pressure compensated flow control valve 64, through velocity fuse 68, through pilot operated check valve 74, through hydraulic flow line 75, through port 77 into the piston end of master cylinder 78. The introduction of pressurized fluid into the piston end of master cylinder 78 causes the master cylinder to extend. Fluid located in the rod end of master cylinder 78 is forced out and travels through port 83 through flow line 98, and flow line 99, through velocity fuse 100, through flow line 110 and through port 111 into the piston end of slave cylinder 112, causing it to extend. The displacement of the rod end of master cylinder 78 is exactly equal to the displacement of the piston end of slave cylinder 112, causing both cylinders to extend the same distance resulting in synchronization of the movements of the master and slave cylinders.

To lower the lift, the operator depresses lever 50 attached to the manual lowering valve 62, allowing fluid to flow in a reversed direction Fluid exits the piston end of slave cylinder 112 through port 111, which passes through velocity fuse 100 into the rod end of master cylinder 78 through port 83. The fluid located in the piston end of master cylinder 78 exits through port 77, through flow line 75, through pilot operated check valve 74, which is held opened by fluid under pressure through pilot line 101, and through velocity fuse 68. The fluid then passes through the pressure compensated flow control valve 64 which regulates the fluid flow rate for the proper and safe lowering speed independent of the load. The fluid reenters the power unit assembly 49 through a second filter 53, through the manual lowering valve 62, and back into the reservoir 48.

Improved elements incorporated into the hydraulic system of the present invention operate as follows:

Velocity fuses 68, 82 and 100 are located at critical cylinder entry ports. If there is a break in a fluid line causing the cylinders to descend at a rapid rate forcing fluid through the fuses at an accelerated rate, fluid flow rate will exceed the pre-set restriction tolerances of elements 69, 84 and 102 and fluid will flow through pilot lines 70, 88 and 106, respectively and close valves 71, 86 and 104, respectively. The cylinders then lock.

Secondly, pilot operated check valve 74 stops fluid flow back through the power unit 49 during the lowering of the cylinders if hydraulic pressure drops in flow line 98 and pilot line 101. Thus the lift stops in a level condition if an obstruction prevents slave cylinder 112 from lowering. Likewise, if an obstruction stops the lowering of master cylinder 78, the lift will stop in a level condition because fluid can not exit slave cylinder 112 and enter master cylinder 78.

Should an out-of-level condition exist between master cylinder 78 and slave cylinder 112 caused by leaking cylinders, a leaking hydraulic fittings or valving, the cylinders are automatically releveled each time the lift is fully lowered onto the ground. This is accomplished via the automatic leveling assembly 90 and operates as follows:

The cylinders are arranged in a way that the pressure in the master cylinder 78 is always greater than the pressure in the slave cylinder 112. Any internal leakage in the system will cause slave cylinder 112 to gain fluid volume. This will cause the master cylinder side of the load bearing element to touch the ground before slave cylinder side touches the ground. The automatic leveling assembly 90 is activated by actuator 93 located on the master cylinder side of the bracket 38 such that the automatic equalization valve 92 is activated when the master cylinder side of bracket 38 touches the ground. Automatic equalization valve 92 opens and fluid is allowed to flow from slave cylinder 112, through velocity fuse 100, and then through the rest of the circuit back to reservoir 48. The fluid displacement in both the master and slave cylinder are equalized, thereby allowing the slave cylinder side of the lift to fully descend and relevel. Manual releveling valve 91 functions in the same manner if the operator chooses to manually relevel the lift.

Upon activation of the pump and the exiting of fluid under pressure from the power assembly 49, check valve 96 stops fluid from flowing backward through the automatic equalization valve 92. This reverse flow would otherwise cause slave cylinder 112 to rise alone. Air located in the rod end of the master cylinder 78, in the piston end of the slave cylinder 112, or in any other valving or hydraulic lines in between the cylinders will have a direct effect on the ability of the lift to raise in a level condition.

If air is trapped in slave cylinder 112, for example, upon raising the lift from a lowered position, master cylinder 78 will raise first Once air in the slave cylinder 112 is compressed to the pressure required to start raising the slave cylinder 112, slave cylinder 112 will begin to raise lagging behind master cylinder 78. To counteract this lagging effect, as much air as possible should be bled from the system. Any air still remaining in the system, as well as any inequality in fluid displacement caused by hydraulic hose expansion effects or by the compressibility of fluid are minimized by the sequence valve 94. When the lift begins to rise from a fully lowered position, fluid is allowed to pass from the piston end of master cylinder 78, through velocity fuse 82, through sequence valve 94, through the automatic equalization valve 92 (which is opened due to pressure on actuator 93 when the lift is in the fully lowered position), through velocity fuse 100 and into slave cylinder 112. Fluid will continue to flow like this until a pre-set pressure in sequence valve 94 is reached, at which point sequence valve 94 closes. This has the effect of pre-pressurizing the fluid in slave cylinder 112 just prior to the lift raising. The pre-set closing pressure of sequence valve 94 is set such that it will allow the pre-pressurization of the fluid but will close before the lift begins to raise, thereby maintaining a level condition independently of the load.

Modifications of the improved hydraulic circuit of the present invention will be apparent to those skilled in the art without departing from the scope of the appended claims. Therefore, the foregoing description and accompanying drawings are intended to be illustrative only and should not be construed in a limiting sense.

Having thus described the invention, what is claimed and desired to be secured by Letters Patent is:

1. A fluid driven two-post lift assembly comprising:
 - a master cylinder having a rod end and a piston end;
 - a slave cylinder having a rod end and a piston end hydraulically connected to said master cylinder, each said cylinder sized so fluid displaced at said rod end of said master cylinder is equal to the fluid displaced at said piston end of said slave cylinder, thereby synchronizing movement of said cylinders;
 - at least one load bearing member operatively connected to said cylinders;
 - a hydraulic circuit to actuate said cylinders;
 - a pilot operated check valve means disposed within said circuit to close and stop said cylinders in an aligned position when an obstruction is encountered under said load bearing member when said load bearing member is being lowered;
 - a plurality of velocity sensor fuse means within said circuit disposed to close and lock said cylinders in place when said velocity sensor fuse means detects an excessive fluid flow rate or excessive velocity of cylinder movement; and
 - a sequence valve disposed to pre-pressurize said slave cylinder to compensate for air and fluid compressibility in said circuit.

2. The improvement of claim 1 further comprising an automatic leveling means for releveling said load bearing member each time said load bearing member is in a fully lowered position.

3. In a two-post hydraulic lift having a master cylinder hydraulically connected to a slave cylinder, at least one load bearing member connected to the cylinders and a conventional hydraulic circuit to actuate the cylinders, the improvement in the hydraulic circuit comprising:

an automatic leveling means for releveling the load bearing member each time the load bearing member is in a fully lowered position;

an automatic equalization valve disposed to allow fluid to flow from said slave cylinder through said hydraulic circuit to a reservoir thereby equalizing the hydraulic fluid displaced within each said cylinder;

an actuator mounted on a low surface of said load bearing member disposed to open said automatic equalization valve when said load bearing member is in a fully lowered position; and a check valve disposed to stop fluid flow from flowing backward through said automatic equalization valve when the lift is actuated.

4. The improvement of claim 3 further comprising a pilot operated check valve means disposed to close and stop the movement of said cylinders in alignment if an obstruction is encountered under a side of said load bearing member when said load bearing member is being lowered.

5. The improvement of claim 4 further comprising a velocity sensor fuse operatively connected to a cylinder port on said master cylinder and a velocity sensor fuse operatively connected to a cylinder port on said slave cylinder, each said velocity sensor fuse disposed to sense increased fluid flow rate and to close so as to lock said cylinders in alignment if there is a sudden drop in hydraulic pressure within said circuit.

6. The improvement of claim 3 further comprising a manual releveling valve which may be opened to relevel said load bearing member.

7. In a two-post hydraulic lift having a master cylinder hydraulically connected to a slave cylinder, a load bearing member connected to each said cylinder, and a hydraulic circuit to actuate the cylinders, an improvement in the hydraulic circuit comprising:

a hydraulic displacement ratio between said master cylinder and said slave cylinder such that fluid displaced at a rod end of said master cylinder is equal to fluid displaced at a piston end of said slave cylinder providing synchronization between said cylinders;

an automatic leveling means for releveling the load bearing member each time the load bearing member is in a fully lowered position, said automatic leveling means having an automatic equalization valve disposed to open to allow fluid to flow from said slave cylinder through said hydraulic circuit to a reservoir thereby equalizing fluid displacement within said cylinders when said automatic equalization valve is actuated and a check valve to stop said fluid from flowing backward through said automatic equalization valve when said lift is raised;

an actuator mounted on a lower surface of said load bearing member disposed to open said automatic equalization valve when said load bearing member is in a fully lowered position; and a sequence valve means for pre-pressurizing said slave cylinder prior to raising thereby compensating for air and fluid compressibility in said circuit.

8. The improvement of claim 7 further comprising a pilot operated check valve means within said circuit disposed to close and stop said cylinders in even alignment if an obstruction is encountered under a side of said load bearing member when said load bearing member is being lowered.

9. A fluid driven two-post lift assembly comprising:

a master cylinder having a rod end and a piston end;

a slave cylinder having a rod end and a piston end hydraulically connected to said master cylinder, each said cylinder sized so fluid displaced at said rod end of said master cylinder is equal to the fluid displaced at said piston end of said slave cylinder, thereby synchronizing movement of said cylinders;

at least one load bearing member operatively connected to said cylinders;

a hydraulic circuit to actuate said cylinders;

a pilot operated check valve means disposed within said circuit to close and stop said cylinders in an aligned position when an obstruction is encountered under a side of said load bearing member when said load bearing member is being lowered;

a plurality of velocity sensor fuse means within said circuit disposed to close and lock said cylinders in place when said velocity sensor means detects an excessive flow rate or velocity of cylinder movement; and an automatic hydraulic leveling means for leveling said load bearing member each time said load bearing member is in a fully lowered position.

10. The invention of claim 9 wherein said automatic leveling means further comprises an automatic equalization valve disposed to open when said load bearing member is in a fully lowered position to allow fluid to flow from said slave cylinder, through said hydraulic circuit to a reservoir thereby equalizing the displacement of hydraulic fluid within said slave cylinder and said master cylinder; and a check valve disposed to stop fluid from flowing backward through said automatic equalization valve when said lift is raised.

* * * * *